(12) United States Patent
Sakabe et al.

(10) Patent No.: US 8,252,398 B2
(45) Date of Patent: Aug. 28, 2012

(54) ADHESIVE VINYLIDENE FLUORIDE RESIN SHEET

(75) Inventors: Hiroshi Sakabe, Tokyo (JP); Toshio Hosokawa, Tokyo (JP)

(73) Assignee: Kureha Corporation, Tokyo (JP)

( * ) Notice: Subject to any disclaimer, the term of this patent is extended or adjusted under 35 U.S.C. 154(b) by 128 days.

(21) Appl. No.: 12/810,592

(22) PCT Filed: Dec. 19, 2008

(86) PCT No.: PCT/JP2008/073213

§ 371 (c)(1),
(2), (4) Date: Jun. 25, 2010

(87) PCT Pub. No.: WO2009/084483

PCT Pub. Date: Jul. 9, 2009

(65) Prior Publication Data

US 2010/0285254 A1 Nov. 11, 2010

(30) Foreign Application Priority Data

Dec. 27, 2007 (JP) ................................. 2007-337263

(51) Int. Cl.
*B29C 47/00* (2006.01)

(52) U.S. Cl. .................... 428/36.9; 328/36.91

(58) Field of Classification Search ............... 428/36.91, 428/213, 422, 421, 36.9; 526/255
See application file for complete search history.

(56) References Cited

U.S. PATENT DOCUMENTS

| 5,415,958 | A  | * | 5/1995  | Takahashi et al. ............ 429/217 |
| 5,739,234 | A  | * | 4/1998  | Kashio et al. ................ 526/255 |
| 5,763,034 | A  | * | 6/1998  | Nishino et al. ............. 428/36.91 |
| 5,776,637 | A  | * | 7/1998  | Kashio et al. ................. 429/217 |
| 6,281,312 | B1 |   | 8/2001  | Enokida et al. |
| 6,372,388 | B1 | * | 4/2002  | Katsurao et al. .............. 429/316 |
| 2007/0026177 | A1 |   | 2/2007 | Kitahara et al. |
| 2007/0166497 | A1 | * | 7/2007 | Shimono et al. .......... 428/36.91 |
| 2007/0219333 | A1 | * | 9/2007 | Shimono et al. .............. 526/249 |
| 2009/0274912 | A1 | * | 11/2009 | Bonnet ........................ 428/422 |
| 2010/0285254 | A1 | * | 11/2010 | Sakabe et al. ................ 428/36.9 |

FOREIGN PATENT DOCUMENTS

| JP | 5-245988    | 9/1993  |
| JP | 6-172452    | 6/1994  |
| JP | 8-239537    | 9/1996  |
| JP | 2000-191709 | 7/2000  |
| JP | 2004-358959 | 12/2004 |
| WO | 96/26980    | 9/1996  |

OTHER PUBLICATIONS

International Search Report issued Mar. 31, 2009 in International (PCT) Application No. PCT/JP2008/073213.

* cited by examiner

*Primary Examiner* — N. Edwards
(74) *Attorney, Agent, or Firm* — Wenderoth, Lind & Ponack, L.L.P.

(57) ABSTRACT

An adhesive vinylidene fluoride resin sheet, including: an extruded sheet of a vinylidene fluoride copolymer composition comprising 100 wt. parts of polymerized units of a vinylidene fluoride monomer containing at least 60 wt. % of vinylidene fluoride, and 0.01-0.8 wt. part of polymerized units of a monoester of unsaturated dibasic acid. The vinylidene fluoride resin sheet is excellent in adhesiveness with another thermoplastic resin layer, and provides a lamination extrusion sheet with such another thermoplastic resin layer taking advantage of the good adhesiveness.

11 Claims, No Drawings

ADHESIVE VINYLIDENE FLUORIDE RESIN SHEET

TECHNICAL FIELD

The present invention relates to a vinylidene fluoride resin sheet excellent in adhesiveness with another thermo-plastic resin layer, particularly an extrusion sheet of vinylidene fluoride resin placed in a lamination state with another thermoplastic resin layer, taking advantage of its good adhesiveness.

BACKGROUND ART

A vinylidene fluoride resin is excellent in chemical resistance, weather resistance, resistance to contamination, etc., and is used as a molding material for various films or sheets, or a coating material, and a binder base. Moreover, since a sheet thereof is excellent also in oil-permeation resistance in addition to the outstanding weather resistance and oil resistance, there have been made some proposals of laminating it with another thermoplastic resin, such as polyamide resin or polyolefin resin, to form a tube for fuel oil supply from a gasoline tank to an engine of a car, as one of the weight-saving means of a car (Patent documents 1-4). The lamination structure is adopted in order to harmonize the excellent oil resistance and oil-permeation resistance of the vinylidene fluoride resin, and the excellent mechanical property of such another thermoplastic resin.

However, fluorine-containing resins including vinylidene fluoride resin are deficient in adhesiveness with other thermoplastic resins as is understood also from their outstanding resistance to soiling. For this reason, in the above-mentioned prior art, there have been adopted various means, such as the surface treatment of a fluorine-containing resin (Patent document 1), the insertion of an adhesive layer (Patent document 2), and the surface treatment of a fluorine-containing resin by grafting with maleic anhydride under irradiation with gamma rays (Patent documents 3 and 4), but it is hard to say that a sufficient adhesiveness is attained thereby.

On the other hand, in order to provide an improved adhesiveness with a metal or a powdery electrode material, there have been also proposed a copolymer of vinylidene fluoride with maleic anhydride, etc. (Patent document 5) and a copolymer of vinylidene fluoride with a monoester of unsaturated dibasic acid (Patent document 6). However, these vinylidene fluoride copolymers have been developed in order to form a paint, an adhesive or a binder in a solution state, and extrusion sheet formation thereof is not contemplated at all, so that it is hard to say that they are, in fact, generally suitable for sheet extrusion.

[Patent document 1] JP-A 6-31877
[Patent document 2] JP-A 6-15790
[Patent document 3] JP-A 2005-162330
[Patent document 4] JP-A 2005-207582
[Patent document 5] JP-A 62-260806
[Patent document 6] JP-A 6-172452

DISCLOSURE OF INVENTION

A principal object of the present invention is to provide a vinylidene fluoride resin sheet excellent in adhesiveness with another thermoplastic resin layer, particularly an extrusion sheet of vinylidene fluoride resin placed in a state of lamination with another thermoplastic resin layer, taking advantage of its good adhesiveness.

According to study of the present inventors, it has been discovered that a vinylidene fluoride copolymer composition containing a very limited amount, smaller than those adopted in the Examples of Patent document 6, of polymerized units of a monoester of unsaturated dibasic acid, is excellent in extrudability into sheets and provides an extrusion sheet which shows good adhesiveness with another thermoplastic resin layer and also a good oil-permeation resistance.

More specifically, according to the present invention, there is provided an adhesive vinylidene fluoride resin sheet, comprising: an extruded sheet of a vinylidene fluoride copolymer composition comprising 100 wt. parts of polymerized units of a vinylidene fluoride monomer containing at least 60 wt. % of vinylidene fluoride, and 0.01-0.8 wt. part of polymerized units of a monoester of unsaturated dibasic acid.

BEST MODE FOR PRACTICING THE INVENTION

The vinylidene fluoride copolymer composition forming the adhesive vinylidene fluoride resin sheet of the present invention, includes 0.01 to 0.8 wt. part of polymerized units of a monoester of unsaturated dibasic acid per 100 wt. parts of polymerized units of a vinylidene fluoride monomer contained in a single vinylidene fluoride copolymer or a mixture thereof with another vinylidene fluoride (co)polymer. As a result, the composition includes the polymerized units of the monoester of unsaturated dibasic acid in a relatively smaller range of amount than in the vinylidene fluoride copolymer used in Patent document 6 (containing 0.1 to 3 wt. parts of polymerized units of monoester of unsaturated dibasic acid), thereby being provided with a better sheet extrudability.

More specifically, the vinylidene fluoride monomer containing at least 60 wt. %, preferably at least 80 wt. %, of vinylidene fluoride used in the present invention, may comprise vinylidene fluoride alone or a mixture of vinylidene fluoride with another monomer. As such another monomer, it is possible to use a fluorine-containing monomer or a hydrocarbon monomer, such as ethylene or propylene, respectively copolymerizable with vinylidene fluoride. Examples of the fluorine-containing monomer copolymerizable with vinylidene fluoride may include: vinyl fluoride, trifluoroethylene, trifluorochloroethylene, tetrafluoroethylene, hexafluoropropylene, and fluoroalkyl vinyl ether. Such another monomer copolymerizable with vinylidene fluoride may preferably be used in a proportion not exceeding 40 wt. %, particularly not exceeding 20 wt. %, of the total of vinylidene fluoride and such another monomer, in consideration of the weather resistance, oil resistance, oil-permeation resistance, flexibility, extrudability, adhesiveness with another thermoplastic resin, etc., of the resultant copolymer.

The monoester of unsaturated dibasic acid to be copolymerize with a monomer principally comprising vinylidene fluoride (namely, a vinylidene fluoride monomer) may preferably be one having 5-8 carbon atoms, and examples thereof may include: monomethyl maleate, monoethyl maleate, monomethyl citraconate, and monoethyl citraconate. Particularly, monomethyl maleate and monomethyl citraconate are preferred.

The copolymerization of the vinylidene fluoride monomer and the monoester of unsaturated dibasic acid can be performed by suspension polymerization, emulsion polymerization, solution polymerization, etc., but suspension polymerization or emulsion polymerization in an aqueous system is preferred in view of ease of after-treatment, for example, and aqueous suspension polymerization is particularly preferred.

In the suspension polymerization using water as a dispersion medium, a suspension agent, such as methyl cellulose, methoxy-methyl cellulose, propoxy-methyl cellulose, hydroxyethyl cellulose, hydroxypropyl cellulose, polyvinyl alcohol, polyethylene oxide or gelatin, may be added and used in a range of 0.005 to 1.0 wt. %, preferably 0.01 to 0.4 wt. %, of the water.

It is possible to use a polymerization initiator, such as diisopropyl peroxy-dicarbonate, di-n-propyl peroxy-dicarbonate, di-n-propyl peroxy-dicarbonate, isobutyryl peroxide, di(chlorofluoroacyl) peroxide, di(perfluoro-acyl) peroxide, tert-butyl peroxy-pivalate, etc. The amount thereof may be 0.1 to 5 wt. %, preferably 0.5 to 2 wt. %, of the total monomer amount (the sum of the vinylidene fluoride monomer and the monoester of unsaturated dibasic acid).

It is also possible to adjust the degree of polymerization of the resultant polymer, by adding a chain transfer agent, such as ethyl acetate, methyl acetate, acetone, ethanol, n-propanol, acetaldehyde, propyl aldehyde, ethyl propionate, carbon tetrachloride, or diethyl carbonate. The amount thereof may be usually 0.1 to 5 wt. %, preferably 0.5 to 3 wt. %, of the total monomer amount.

The totally charged amount of the monomers maybe such as to provide a weight ratio of the total monomer amount: water=1:1-1:10, preferably 1:2-1:5, and the polymerization may be performed at a temperature of 10-80° C. for 5 to 100 hours.

The vinylidene fluoride monomer and the monoester of unsaturated dibasic acid can be copolymerized easily by the above-mentioned suspension polymerization.

The vinylidene fluoride copolymer composition forming the adhesive vinylidene fluoride resin sheet of the present invention, contains 0.01-0.8 wt. part, preferably 0.05-0.6 wt. part, of polymerized units (almost corresponding to the charged monomer ratio) of the monoester of unsaturated dibasic acid per 100 wt. parts of polymerized units of the vinylidene fluoride monomer by the vinylidene fluoride copolymer produced in the above-described manner alone or in mixture with another vinylidene fluoride (co)polymer produced in a similar manner. If the amount of the polymerized units of the monoester of unsaturated dibasic acid is less than 0.01 wt. part, the effect of improving the adhesiveness with another thermoplastic resin becomes scarce. On the other hand, if the amount exceeds 0.8 wt. part, the (co)extrudability of the vinylidene fluoride copolymer composition is liable to be lowered, be foamed or cause exudation, so that it becomes difficult to form a sheet with a smooth surface. For a similar reason the vinylidene fluoride copolymer composition may preferably have a carbonyl group content in a range of $8\times 10^{-7}$-$6\times 10^{-5}$ mole/g, particularly $4\times 10^{-6}$-$5\times 10^{-5}$ mole/g.

Incidentally, the content of the polymerized units of the monoester of unsaturated dibasic acid in an individual vinylidene fluoride copolymer forming the vinylidene fluoride copolymer composition, can exceed 0.8 wt. % as far as it does not exceed the upper limit thereof in the composition which may be obtained by mixing the vinylidene fluoride copolymer with another (co)polymer, but the content may preferably be suppressed to at most 3 wt. parts so as to avoid difficulties that can be caused by insufficient mixing.

The vinylidene fluoride copolymer composition used in the present invention may preferably have a solution viscosity (herein meaning a logarithmic viscosity number at 30° C. of a solution of 4 g-resin in 1 liter of N, N dimethyl-formamide), as a measure of molecular weight, of 0.5 to 2.0 dl/g, more preferably 0.8 to 2.0 dl/g, particularly preferably 0.8-1.5 dl/g.

The adhesive vinylidene fluoride resin (vinylidene fluoride copolymer composition) obtained in the above-described manner can also be extruded independently into a sheet and then laminated with another thermoplastic resin layer by the medium of an adhesive layer or by hot melt welding, or can be used for lamination sheet formation with another thermoplastic resin layer by the extrusion lamination of such another thermoplastic resin. More preferably, however, the thus-obtained adhesive vinylidene fluoride resin may be used for co-extrusion lamination with another thermoplastic resin by taking advantage of its excellent (co)extrudability. For this purpose, there may be adopted a conventional co-extrusion process using a number of single screw- or twin screw-extruders corresponding to the number of extruded resins and a number of T-dies or an annular die (and a mandrel as required) corresponding to the number of laminated layers. A flat co-extruded sheet is formed by using T-dies, and a co-extruded tube is formed by using an annular die.

Typical examples of lamination patterns with another thermoplastic resin may: include: another thermoplastic resin/adhesive vinylidene fluoride resin, and another thermoplastic resin/adhesive vinylidene fluoride resin/another thermoplastic resin, sequentially from one side (or an outside in the case of a tube). When the use as a fuel tube is contemplated as a typical example of application, preferred examples of such another thermoplastic resin may include: polyamide resins, polyolefin resins and polyurethane resin, among which polyamide resins, such as polyamide 12 and polyamide 11, are especially preferred. It is possible to use such a thermoplastic resin after improving the adhesive-ness by introducing a functional group, such as a carbonyl group, as required.

Although the thickness ratio of the adhesive vinylidene fluoride resin and such another thermoplastic resin in the case of laminating is determined by the balance of the properties, such as weather resistance and resistance to oil (penetration), owing to the vinylidene fluoride resin, and the mechanical properties owing to such another thermoplastic resin depending on the use contemplated, a ratio of 1:99 to 50:50, preferably 10:90 to about 30:70, may be used in the case of a typical fuel tube. Moreover, the total thickness in the case of use as a fuel tube may be about 0.1-5 mm, preferably 0.3-3 mm.

EXAMPLES

The present invention will be described in further detail hereafter with reference to Examples and Comparative Example.

[Measurement of Carbonyl Group Content]

The carbonyl group contents of the obtained polymers were measured according to the following method.

IR (infrared) spectra were obtained with respect to several sample resins formed by mixing polyvinylidene fluoride resin and polymethyl methacrylate resin in specified proportions, and the ratios of an absorption at 1726 $cm^{-1}$ to an absorption at 881 $cm^{-1}$ were measured for respective spectra and plotted versus carbonyl group contents in the samples to prepare a calibration curve.

A sample polymer was washed with hot water and subjected to the Soxhlet's extraction with benzene for 24 hours at 80° C. to remove unreacted monomer and homopolymer possibly remaining in the sample polymer. The sample polymer was then subjected to the measurement of a ratio of an absorption attributable to the carbonyl group resulting from the mono-esterified unsaturated dibasic acid to an absorption at 881 cm$^{-1}$ in the IR spectrum, and a carbonyl group content in the sample was calculated from the above-prepared calibration curve. For reference, the carbonyl groups (including the carbonyl group in an ester group and the carbonyl group in a carboxyl group) resulting from the mono-esterified unsaturated dibasic acid show an absorption in the range of 1700-1850 cm$^{-1}$ (e.g., 1747 cm$^{-1}$ in the case of monomethyl maleate). On the other hand, polyvinylidene fluoride or a copolymer of vinylidene fluoride with a fluorine-containing monomer or a hydrocarbon monomer, does not show a remarkable absorption in the range of 1500-2500 cm$^{-1}$.

Example of Preparation of a Vinylidene Fluoride (Co)Polymer

Synthesis Example 1

Preparation of Vinylidene Fluoride Copolymer 1

Into a 2-liter autoclave, 1040 g of deionized water, 0.6 g of methyl cellulose, 3 g of ethyl acetate, 4 g of diisopropyl peroxy-dicarbonate, 398 g of vinylidene fluoride and 2 g of monomethyl maleate, were charged (vinylidene fluoride: monomethyl maleate=100:0.50), and subjected to suspension polymerization at 25° C. for 42 hours. After completion of the polymerization, the polymerizate slurry was dewatered, washed with water and dried at 80° C. to obtain powdery Copolymer 1.

The polymerization rate was 85 wt. %, and the-thus obtained polymer exhibited a solution viscosity of 1.1 dl/g, and a carbonyl group content of 0.6×10$^{-4}$ mole/g.

Synthesis Example 2

Preparation of Vinylidene Fluoride Copolymer 2
Corresponding to Example 1 of Patent Document 6)

Into a 2-liter autoclave, 1040 g of deionized water, 0.8 g of methyl cellulose, 2.5 g of ethyl acetate, 4 g of diisopropyl peroxy-dicarbonate, 396 g of vinylidene fluoride and 4 g of monomethyl maleate, were charged (vinylidene fluoride: monomethyl maleate=100:1.01), and subjected to suspension polymerization at 28° C. for 47 hours. After completion of the polymerization, post treatments were performed similarly as in Synthesis Example 1 to obtain powdery Copolymer 2.

The polymerization rate was 90 wt. %, and the obtained polymer exhibited a solution viscosity of 1.1 dl/g, and a carbonyl group content of 1.2×10$^{-4}$ mole/g.

Synthesis Example 3

Preparation of Vinylidene Fluoride Copolymer 3

Into a 2-liter autoclave, 1040 g of deionized water, 0.4 g of methyl cellulose, 8 g of ethyl acetate, 2 g of di-n-propyl peroxy-dicarbonate and 400 g of vinylidene fluoride, were charged, and subjected to suspension polymerization at 25° for 22 hours. After completion of the polymerization, post treatments were performed similarly as in Synthesis Example 1 to obtain powdery Polymer 3.

The polymerization rate was 85 wt. %, and the obtained polymer exhibited a solution viscosity of 1.1 dl/g.

Synthesis Example 4

Preparation of Vinylidene Fluoride Copolymer 4

Into a 2-liter autoclave, 1040 g of deionized water, 0.4 g of methyl cellulose, 8 g of ethyl acetate, 2 g of di-n-propyl peroxy-dicarbonate, 399.8 g of vinylidene fluoride and 0.2 g of monomethyl maleate, were charged (vinylidene fluoride: monomethyl maleate=100:0.05), and subjected to suspension polymerization at 25° C. for 24 hours. After completion of the polymerization, the polymerizate slurry was treated similarly as in Synthesis Example 1 to obtain powdery Copolymer 4.

The polymerization rate was 85 wt. %, and the obtained polymer exhibited a solution viscosity of 1.1 dl/g, and a carbonyl group content of 0.06×10$^{-4}$ mole/g.

Synthesis Example 5

Preparation of Vinylidene Fluoride Copolymer 5

Into a 2-liter autoclave, 1040 g of deionized water, 0.6 g of methyl cellulose, 6 g of ethyl acetate, 4 g of diisopropyl peroxy-dicarbonate, 375.2 g of vinylidene fluoride, 24 g of chlorotrifluoroethylene and 0.8 g of monomethyl maleate, were charged {(vinylidene fluoride+chlorotrifluoroethylene): monomethyl maleate=100:0.20}, and subjected to suspension polymerization at 25° C. for 25 hours. After completion of the polymerization, the polymerizate slurry was treated similarly as in Synthesis Example 1 to obtain powdery Copolymer 5.

The polymerization rate was 85 wt. %, and the obtained polymer exhibited a solution viscosity of 1.0 dl/g, and a carbonyl group content of 0.06×10$^{-4}$ mole/g.

Synthesis Example 6

Preparation of Vinylidene
Fluoride-Hexafluoropropylene Copolymer 6

Into a 2-liter autoclave, 1040 g of deionized water, 0.4 g of methyl cellulose, 8 g of ethyl acetate, 2 g of di-n-propyl peroxy-dicarbonate, 352 g of vinylidene fluoride and 48 g of hexafluoropropylene, were charged, and subjected to suspension polymerization at 25° C. for 20 hours. After completion of the polymerization, the polymerizate slurry was treated similarly as in Synthesis Example 1 to obtain powdery Copolymer 6.

The polymerization rate was 85 wt. %, and the obtained polymer exhibited a solution viscosity of 1.0 dl/g.

<Preparation of vinylidene fluoride (co)polymer compositions>

The above-obtained vinylidene fluoride (co)polymers, alone or in a blend as shown in the following Table 1, were respectively pelletized by means of an equi-directionally rotating twin-screw extruder to obtain Vinylidene fluoride (co)polymer compositions of Examples 1-6 and Comparative Examples 1-2. The extrusion was performed while adjusting the cylinder temperature conditions so as to provide a resin temperature at the die outlet in a range of 220-250° C.

TABLE 1

Vinylidene-fluoride-resin composition

| Example | Proprtion(s) of (co)polymers forming a composition [Wt. parts] | | | | | | Charged amount of MMM** per 100 parts of vinylidene fluoride monomer [Wt. part] |
|---|---|---|---|---|---|---|---|
| | Copolymer 1 | Copolymer 2 | Homopolymer 3 | Copolymer 4 | Copolymer 5 | Copolymer 6* | |
| 1 | 100 | | | | | | 0.50 |
| 2 | | | | 100 | | | 0.05 |
| 3 | | 50 | 50 | | | | 0.50 |
| 4 | | 20 | 80 | | | | 0.20 |
| 5 | | | | | 100 | | 0.20 |
| 6 | | 50 | | | | 50 | 0.50 |
| Comp. 1 | | 100 | | | | | 1.01 |
| Comp. 2 | | | 100 | | | | 0 |

*Vinylidene fluoride-hexafluoropropylene copolymer
**MMM: Monomethyl maleate (Comparative Example 3)

For comparison, a commercially available adhesiveness-improved copolymer vinylidene fluoride resin (maleic anhydride-grafted polyvinylidene fluoride; "Kynar ADX20" available from Arkema, Japan; used in Example of Patent document 3) was used.

<Another Thermoplastic Resin> as another thermoplastic resin, the following two species of polyamide resin were used:

Commercially available polyamide 12 ("Diamide X7293", made by Daicel-Degussa Ltd.)

Commercially available adhesiveness-improved polyamide 12 ("Diamide X7297", made by Daicel-Degussa Ltd.).

<Extrusion of a Two-Layer Sheet>

One species of the vinylidene fluoride (co)polymer compositions of Examples 1-6 or Comparative Examples 1-3 described above and one species of the above-mentioned another thermoplastic resin, were co-extruded by using two single-screw extruders (for vinylidene fluoride resin and for polyamide, respectively) and a multi-manifold multi-layer T-die, to form totally 18 types of two-layer sheets each in a thickness of 540 μm (including 180 μm of vinylidene fluoride resin layer and 360 μm of polyamide layer).

The thus-obtained 18 types of two-layer sheets were each evaluated with respect to the following items.

[Extrudability]

The appearance of each two-layer sheet was observed visually and evaluated according to the following standard:

A: Extrudability was good and the appearance of each layer of the two-layer sheet was good, B: Extrudability was good, but slight vertical streaks were generated on the surface of the vinylidene-fluoride-resin layer of the two-layer sheet, C: Foaming of the vinylidene fluoride resin layer occurred, and surface roughness and remarkable vertical streaks were generated, until continuous operation became impossible.

[Peel Strength]

Based on the T-peel strength measurement method for adhesives according to JIS K6854-3, a peel strength between the vinylidene fluoride resin layer and the polyamide layer of each two-layer sheet sample at a sample width of 5 mm, was measured by using a tensile testing machine ("STA-1150", made by K.K. Orientec). "No peeling" in Table 2 appearing hereinafter means a peel strength exceeding 15 N/cm and represents a good adhesion state.

[Fuel Permeability]

A simulated fuel "Fuel CE10" (isooctane/toluene/ethanol=45/45/10 (wt.) mixture) was used, and a sample vinylidene fluoride resin/polyamide two-layer sheet was disposed so that the vinylidene fluoride resin layer contacted the fuel, whereby a fuel permeability [g/m²·day·atm] was measured at 65° C. by using a differential pressure-type gas•water vapor permeability measuring apparatus ("GTR-30XAKC", made by GTR Tec K.K.).

Based on the thus-measured total fuel permeability while disregarding the fuel permeation barrier characteristic of the polyamide layer, a permeation coefficient per unit thickness (more specifically, by multiplying the actual vinylidene fluoride resin layer thickness of 180 μm(=0.018 cm)) of the vinylidene fluoride resin layer [in terms of g·cm/m²·day·atm] was calculated.

The evaluation results with respect to the above-mentioned items of the 18 types of two-layer sheets are inclusively shown in the following Table 2.

TABLE 2

The extrudability, peel strength, and fuel permeability of a two-layerr extrusion sheet

| Example | MMM content*[1] in composition (Wt. part) | Polyamide type | Extrudability | Peel strength [N/cm] | "Fuel CE-10" permeability [g/m² · day · atm] | | | | Permeation coefficient [g · cm/m² · day · atm] |
|---|---|---|---|---|---|---|---|---|---|
| | | | | | Isooctane | Toluene | Ethanol | Total | |
| 1 | 0.50 | PA12 | B | No peeling. | 0.00 | 3.77 | 26.3 | 30.1 | 5.4 |
| | | Adhesive PA12 | B | No peeling. | 0.00 | 3.64 | 27.5 | 31.1 | 5.6 |
| 2 | 0.05 | PA12 | A | No peeling. | 0.01 | 3.32 | 20.8 | 24.1 | 4.3 |
| | | Adhesive PA12 | A | No peeling. | 0.01 | 3.53 | 22.0 | 25.5 | 4.6 |
| 3 | 0.50 | PA12 | B | No peeling. | 0.01 | 3.21 | 21.9 | 25.1 | 4.5 |
| | | Adhesive PA12 | B | No peeling. | 0.00 | 3.96 | 25.9 | 30.0 | 5.4 |

TABLE 2-continued

The extrudability, peel strength, and fuel permeability of a two-layerr extrusion sheet

| Example | MMM content*[1] in composition (Wt. part) | Polyamide type | Extrudability | Peel strength [N/cm] | "Fuel CE-10" permeability [g/m² · day · atm] Isooctane | Toluene | Ethanol | Total | Permeation coefficient [g · cm/m² · day · atm] |
|---|---|---|---|---|---|---|---|---|---|
| 4 | 0.20 | PA12 | A | No peeling. | 0.00 | 3.42 | 23.1 | 26.5 | 4.8 |
|   |      | Adhesive PA12 | A | No peeling. | 0.01 | 3.25 | 21.4 | 24.7 | 4.4 |
| 5 | 0.20 | PA12 | A | No peeling. | 0.03 | 5.76 | 37.8 | 43.6 | 7.8 |
|   |      | Adhesive PA12 | A | No peeling. | 0.03 | 5.88 | 39.1 | 45.0 | 8.1 |
| 6 | 0.50 | PA12 | B | No peeling. | 0.04 | 7.02 | 41.5 | 48.5 | 8.7 |
|   |      | Adhesive PA12 | B | No peeling. | 0.04 | 7.63 | 33.0 | 40.6 | 7.3 |
| Comp. 1 | 1.01 | PA12 | C | No peeling. | 0.01 | 3.27 | 24.2 | 27.5 | 5.0 |
|   |      | Adhesive PA12 | C | No peeling. | 0.01 | 3.73 | 26.4 | 30.1 | 5.4 |
| Comp. 2 | 0 | PA12 | A | 1.8 | 0.00 | 3.32 | 21.0 | 24.3 | 4.4 |
|   |   | Adhesive PA12 | A | No peeling. | 0.00 | 3.14 | 22.7 | 25.8 | 4.6 |
| Comp. 3 | 0.6*[2] | PA12 | B | <0.2 | 0.01 | 6.51 | 39.7 | 44.4 | 8.0 |
|   |   | Adhesive PA12 | B | 13.8 | 0.01 | 6.18 | 29.0 | 35.2 | 6.3 |

*[1]Amount of MMM (monomethyl maleate) per 100 wt. parts of vinylidene fluoride on a charge basis
*[2]Commercially available 0.6%- maleic anhydride-grafted PVDF homopolymer In view of the above Table 2, the vinylidene fluoride copolymer compositions of the present invention containing a small amount of polymerized units of monoester of unsaturated dibasic acid per 100 wt. parts of polymerized units of a vinylidene fluoride monomer, when laminated with a polyamide by co-extrusion (Examples 1-6), exhibited excellent extrudability and low fuel permeability, and further exhibited a good inter-layer adhesion even in the case of being co-extrusion-laminated with an ordinary-grade polyamide (i.e., not an adhesiveness-improved-grade polyamide)

On the other hand, Comparative Example 1 using a composition with a larger amount of polymerized units of the monoester of unsaturated dibasic acid exhibited a difficulty in extrudability, whereas the adhesiveness improvement effect was insufficient by either Comparative Example 2 not including polymerized units of the monoester of unsaturated dibasic acid, or Comparative Example 3 using a commercially available vinylidene fluoride resin of adhesiveness-improved grade.

Industrial Applicability

As described above, according to the present invention, a very small amount of polymerized units of monoester of unsaturated dibasic acid is introduced into a vinylidene fluoride resin showing poor adhesiveness with another thermoplastic resin as a polymerized unit in a vinylidene fluoride copolymer, thereby providing an extrusion sheet which is excellent in sheet extrudability and shows a good adhesiveness with another thermoplastic resin layer and also a good oil-permeation resistance.

The invention claimed is:

1. An adhesive vinylidene fluoride resin-based laminate sheet, comprising: an extruded sheet of a vinylidene fluoride copolymer composition, and a layer of another thermoplastic resin layer placed in an adhesive lamination state with the extruded sheet; wherein the vinylidene fluoride copolymer composition comprises 100 wt. parts of polymerized units of a vinylidene fluoride monomer containing at least 60 wt. % of vinylidene fluoride, and 0.01-0.8 wt. part of polymerized units of a monoester of unsaturated dibasic acid.

2. The laminate sheet according to claim 1, wherein the vinylidene fluoride copolymer composition comprises a single vinylidene fluoride copolymer.

3. The laminate sheet according to claim 1, wherein the vinylidene fluoride copolymer composition comprises a mixture of a vinylidene fluoride copolymer and a vinylidene fluoride homopolymer.

4. The laminate sheet according to claim 1, wherein the vinylidene fluoride copolymer composition comprises a mixture of a plurality of vinylidene fluoride copolymers.

5. The laminate sheet according to claim 1, wherein the monoester of unsaturated dibasic acid is selected from the group consisting of monomethyl maleate, monoethyl maleate, monomethyl citraconate, and monoethyl citraconate.

6. The laminate sheet according to claim 1, wherein the vinylidene fluoride copolymer composition comprises 0.05 to 0.6 wt. part of polymerized units of the monoester of the unsaturated dibasic acid.

7. The laminate sheet according to claim 1, wherein the vinylidene fluoride copolymer composition has a carbonyl group content of $8 \times 10^{-7}$-$6 \times 10^{-5}$ mole/g.

8. The laminate sheet according to claim 1, wherein said another thermoplastic resin layer is placed in a co-extrusion lamination state with the extruded sheet of the vinylidene fluoride copolymer composition.

9. The laminate sheet according to claim 1, wherein said another thermoplastic resin comprises polyamide resin.

10. The laminate sheet according to claim 8, having a thickness ratio of 1:99-50:50 between said vinylidene fluoride resin sheet and said another thermoplastic resin layer.

11. The laminate sheet according to claim 1, having a shape of a tube as a whole.

* * * * *